Aug. 30, 1960 B. BRIGHTMAN 2,951,126

ELECTRONIC SWITCHING TELEPHONE SYSTEM CHANNEL ALLOTTER

Filed July 24, 1958 8 Sheets-Sheet 1

INVENTOR.
BARRIE BRIGHTMAN

BY F. H. Henson

ATTORNEY

Aug. 30, 1960 B. BRIGHTMAN 2,951,126

ELECTRONIC SWITCHING TELEPHONE SYSTEM CHANNEL ALLOTTER

Filed July 24, 1958 8 Sheets-Sheet 3

CHANNEL ALLOTTER

Aug. 30, 1960 B. BRIGHTMAN 2,951,126

ELECTRONIC SWITCHING TELEPHONE SYSTEM CHANNEL ALLOTTER

Filed July 24, 1958 8 Sheets-Sheet 4

Aug. 30, 1960 B. BRIGHTMAN 2,951,126

ELECTRONIC SWITCHING TELEPHONE SYSTEM CHANNEL ALLOTTER

Filed July 24, 1958 8 Sheets-Sheet 5

Aug. 30, 1960 B. BRIGHTMAN 2,951,126

ELECTRONIC SWITCHING TELEPHONE SYSTEM CHANNEL ALLOTTER

Filed July 24, 1958 8 Sheets-Sheet 6

Aug. 30, 1960 B. BRIGHTMAN 2,951,126

ELECTRONIC SWITCHING TELEPHONE SYSTEM CHANNEL ALLOTTER

Filed July 24, 1958 8 Sheets-Sheet 7

CHANNEL ALLOTTER CONTROL

United States Patent Office 2,951,126

Patented Aug. 30, 1960

2,951,126

ELECTRONIC SWITCHING TELEPHONE SYSTEM CHANNEL ALLOTTER

Barrie Brightman, Rochester, N.Y., assignor to General Dynamics Corporation, Rochester, N.Y., a corporation of Delaware Filed July 24, 1958, Ser. No. 750,619

6 Claims. (Cl. 179—18)

This invention relates in general to electronic switching systems and, more particularly, to channel allotters for use in electronic switching telephone systems of the type shown and described in copending application Serial No. 721,241, filed March 13, 1958, and assigned to the same assignee as the present invention.

In the system disclosed in the above-identified application, the lines are interconnected by a multichannel transmission highway network of the time division channel type and an individual channel on said network is assigned to each calling line in turn by a channel allotter provided in the system. Only one channel allotter is provided in the system disclosed in the above-identified application and if that allotter should fail, the result is catastrophic. The use of dual allotters for assigning line finders or other equipment for use in turn is, of course, well known in the electromechanical switching art but the techniques utilized to effect transfer from a regular to a standby electromechanical equipment allotter are not adaptable to an electronic switching system of the type disclosed in the above-identified application. Further, since the allotter disclosed in the above-identified application comprises transistors as the active elements thereof, the type or cause of failure cannot be readily ascertained, as it can in electromechanical systems, by merely routining the equipment.

Accordingly, it is the general object of this invention to provide a new and improved electronic switching telephone system.

It is a more particular object of this invention to provide new and improved circuitry for automatically switching a standby channel allotter into use upon the failure of the regular channel allotter, and for indicating the type or cause of failure in an electronic switching telephone system of the type in which the lines of the system are interconnected by a multichannel transmission highway network.

Briefly, the present invention accomplishes the above cited objects in the following manner. Each of the channel allotters comprises a distributor having a plurality of settings individually corresponding to the channels of the transmission highway network and a plurality of busy indicating bi-stable circuits individually corresponding to the channels of the network. The distributors are controlled to advance in synchronism and a marking signal identifying a channel is transmitted to the lines of the system by the regular allotter when the distributor in the regular allotter is in the setting corresponding to that channel and only if the regular allotter busy indicating circuit corresponding to that channel is in its first operated condition, which indicates that the channel is idle. When the channel identified by the marking signal is seized by a calling line, the busy indicating circuits corresponding to that channel in both the regular and standby allotters are operated to their second operated condition and the distributors are advanced to their next succeeding settings. First and second alarm devices, which are preferably of the visual indicating type, are provided for each channel of the transmission network. The first alarm device corresponding to a particular channel is energized if the regular allotter busy indicating circuit corresponding to that channel is operated to its second operated condition and the standby allotter busy indicating circuit corresponding to that channel is operated to its first operated condition, while the second alarm device corresponding to a particular channel is energized if the standby allotter busy indicating circuit corresponding to that channel is in its second operated condition and the regular allotter busy indicating circuit corresponding to that channel is in its first operated condition. Transfer is made to the standby allotter responsive to the energization of any one of the second alarm devices.

By observation of the alarm devices, maintenance personnel can ascertain which of the allotters has failed to register the busy condition of a particular channel. The alarmed channel is then monitored to determine whether it is actually idle or busy and, in accordance with said determination, the operated condition of the faulty busy indicating circuit can be selectively changed by the operation of suitable keys provided in the system. The operation of a reset key also serves to reset the allotter distributors to the same settings so that they again operate in synchronism.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise eight figures on eight sheets.

Figure 1:
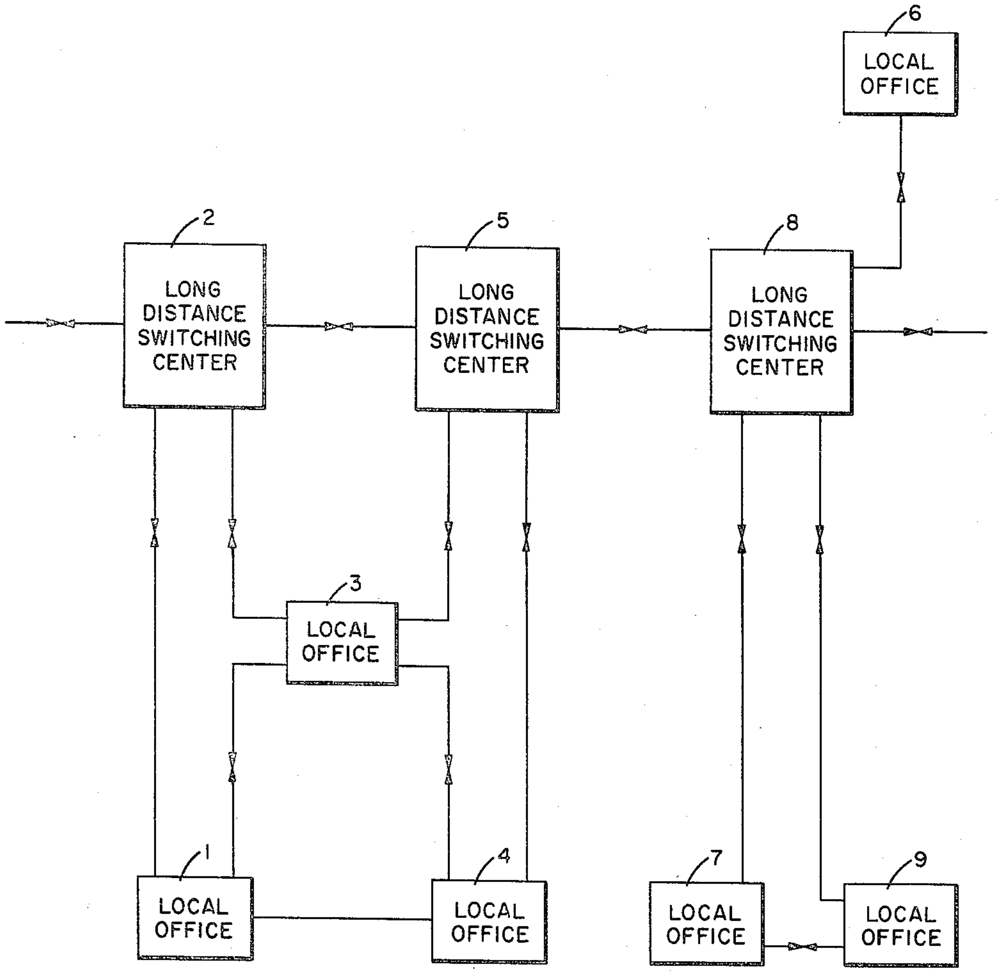
Fig. 1 shows the trunking diagram of a telephone system in which the invention may be embodied.
Figure 3:
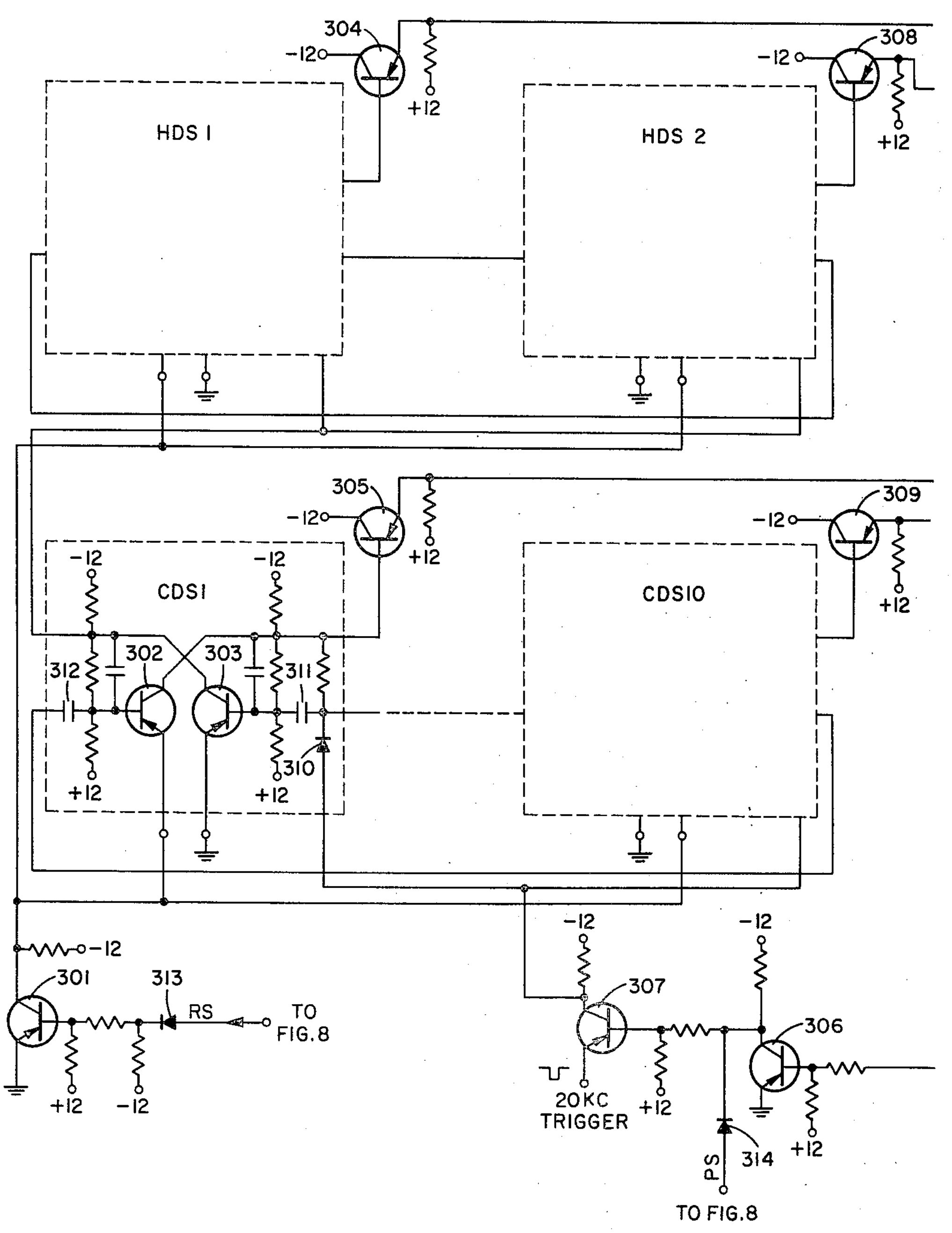
Figure 4:
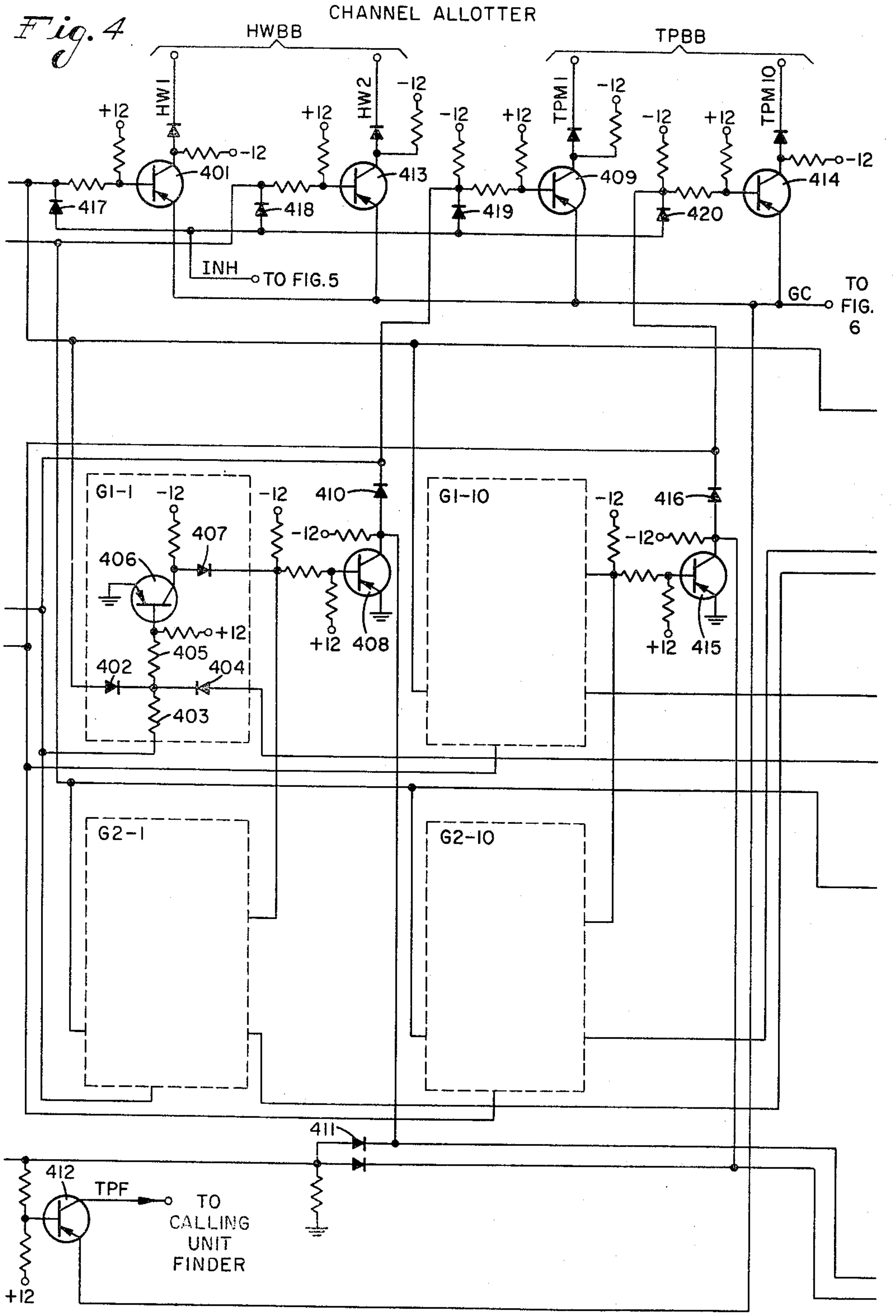
Figure 5:
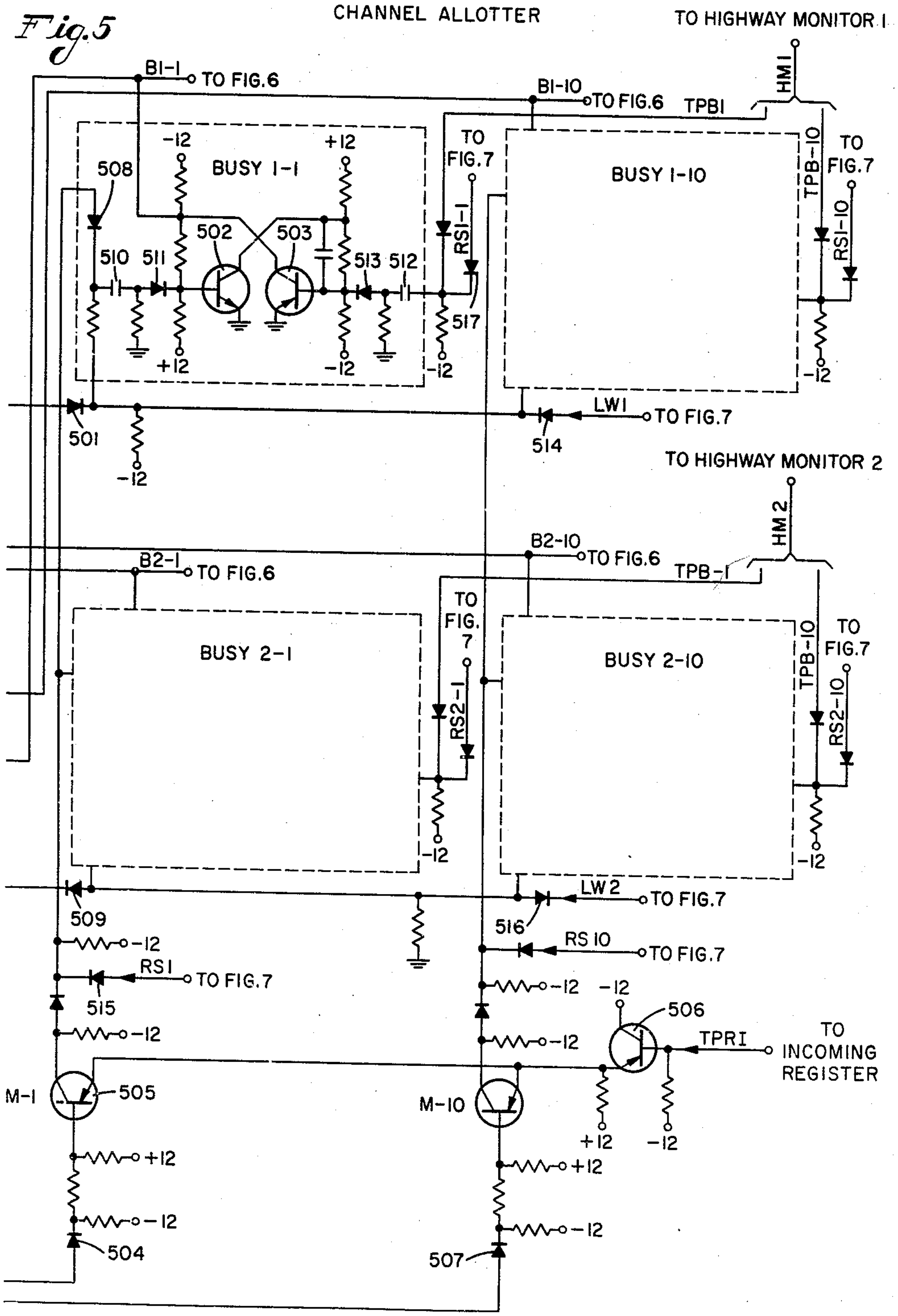

Figs. 3–5, when arranged in numerical order from left to right, show details of a channel allotter for use in the system shown in block diagram form in Fig. 1.

Figure 6:
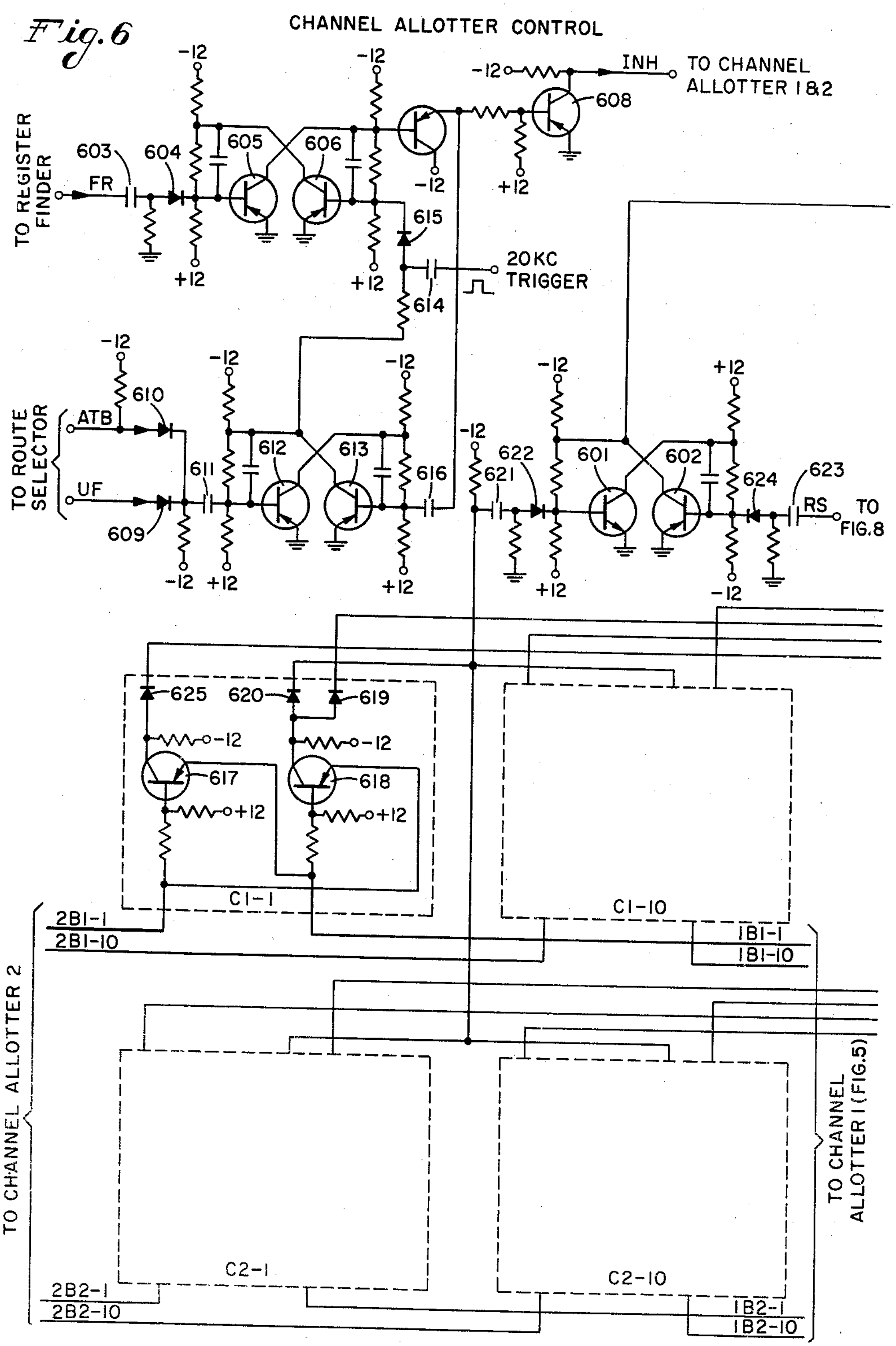
Figure 7:
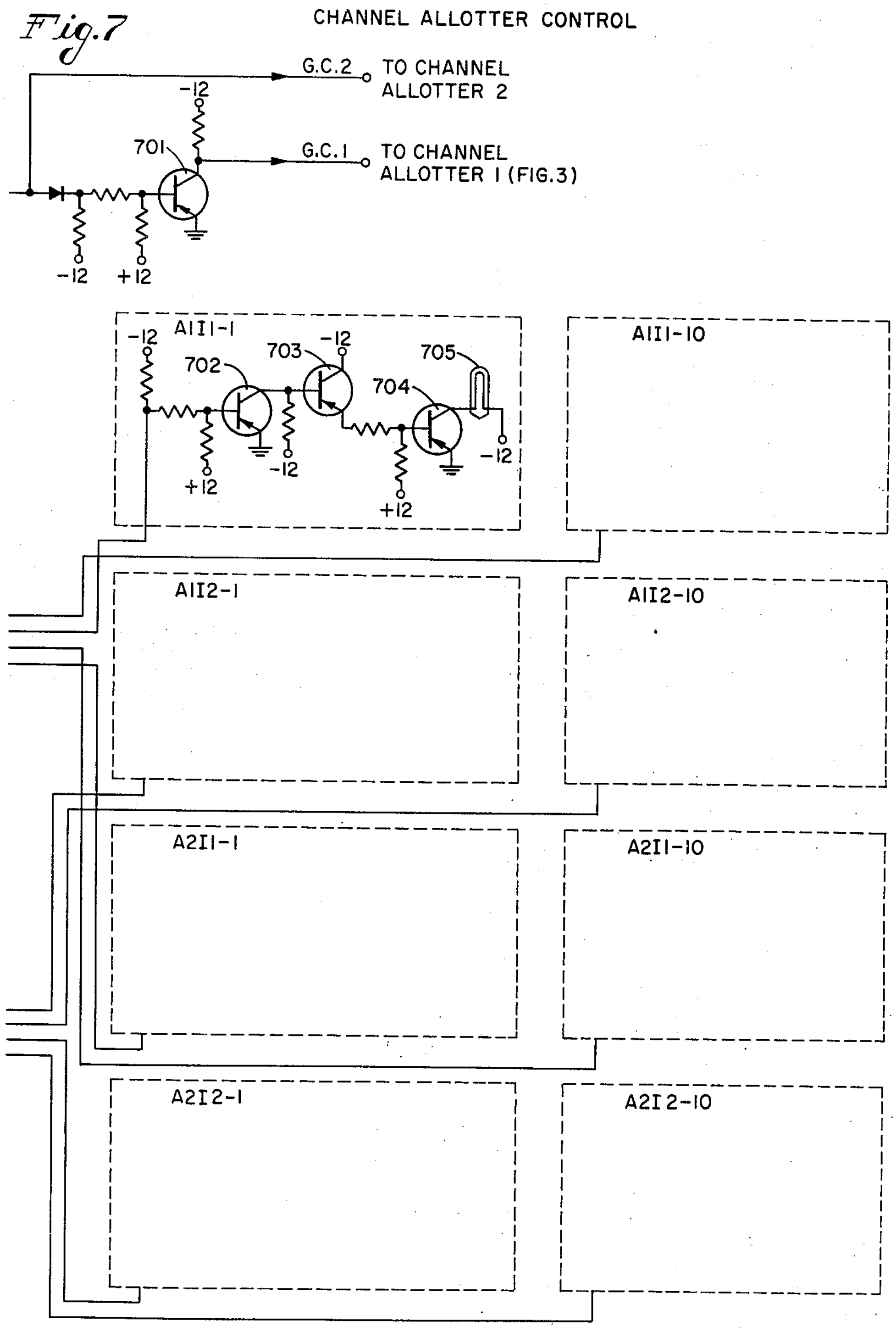
Figure 8:
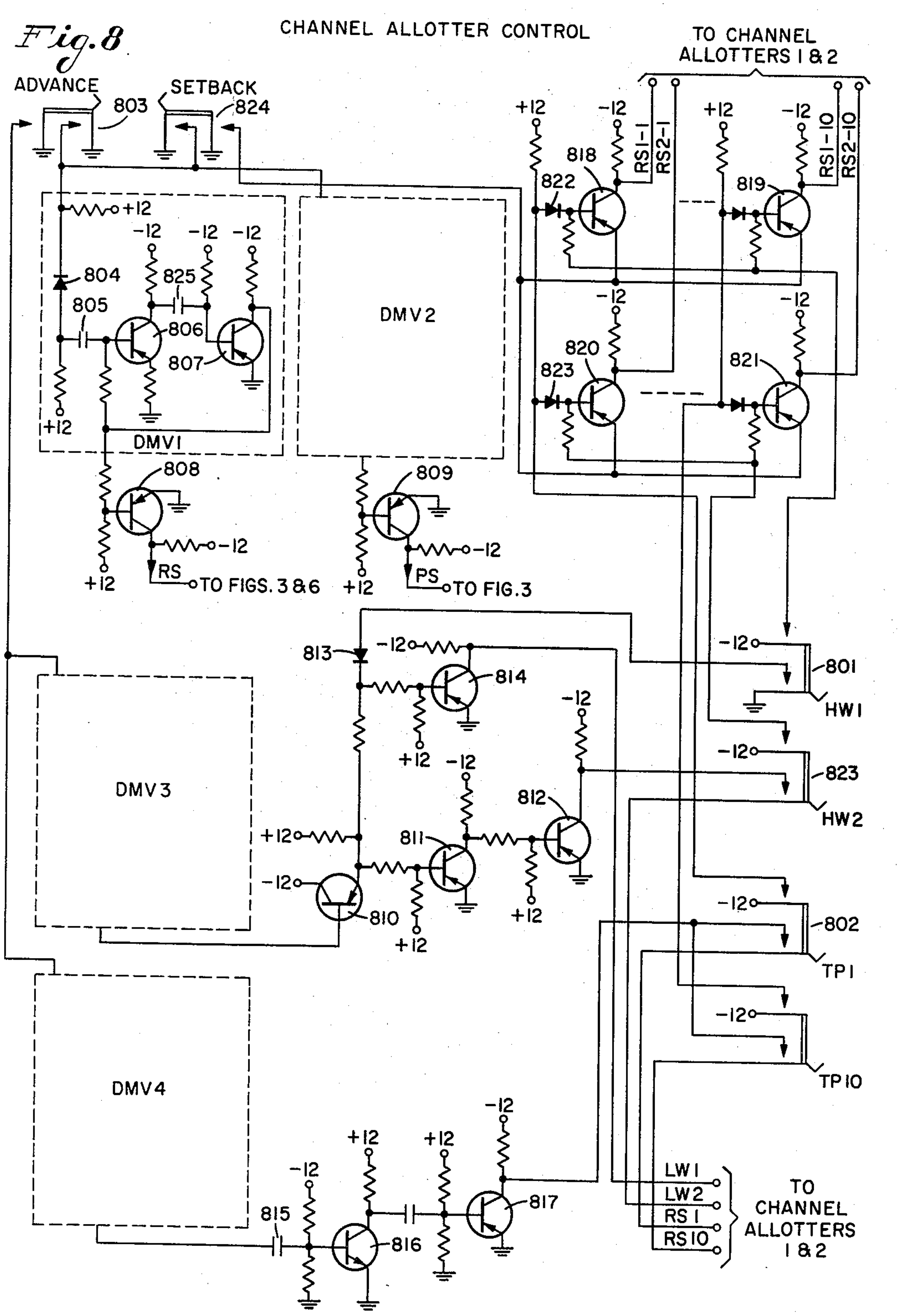

Figs. 6–8, when arranged in numerical order from left to right, show details of a channel allotter control circuit for use in the system shown in block diagram form in Fig. 1.

Figure 2:
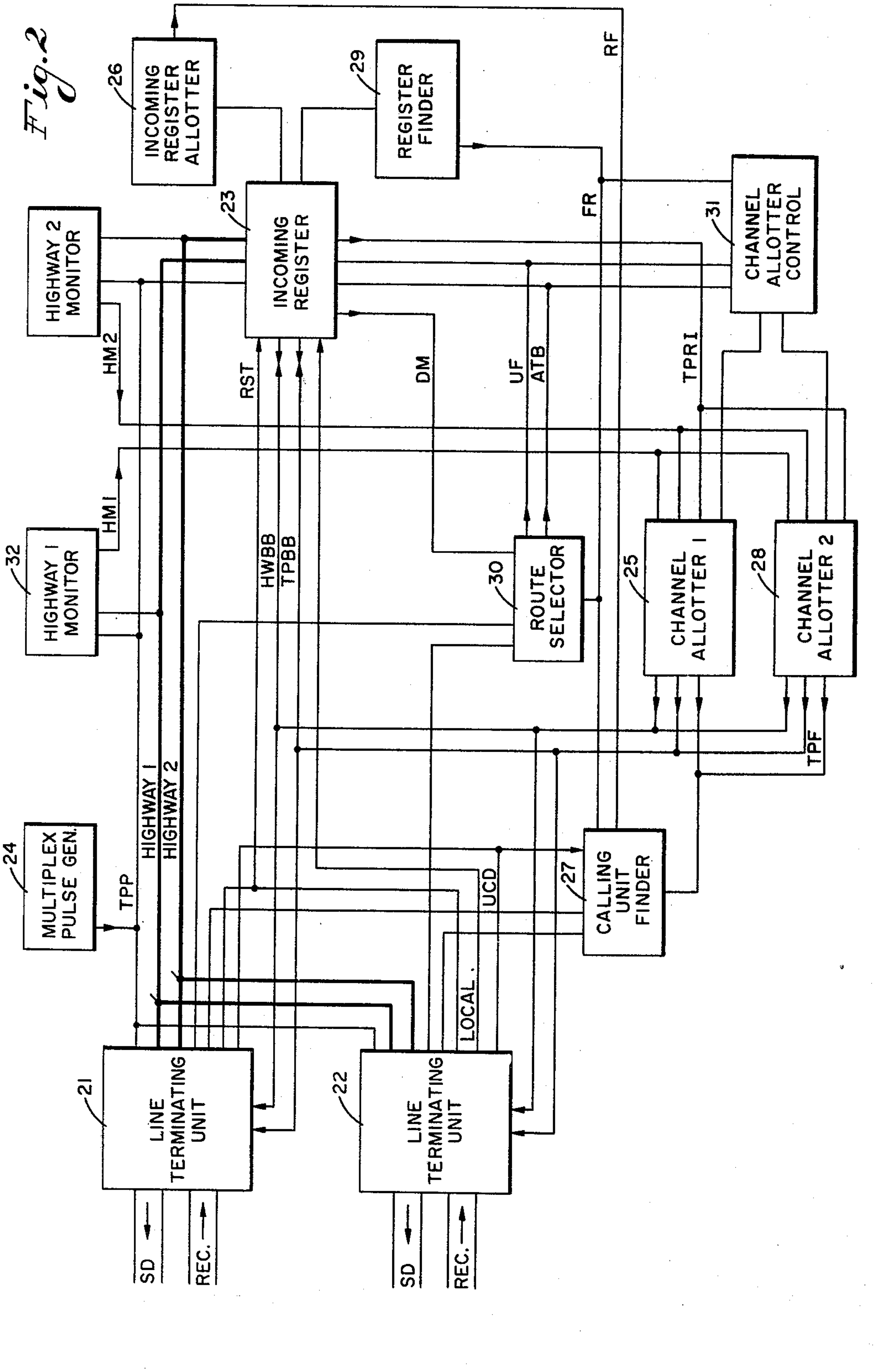
Fig. 2 shows a long distance switching center in block diagram form.

The overall operation of the system in which the invention has been illustrated can best be understood by reference to Fig. 2 in conjunction with reference to the trunking diagram shown in Fig. 1. It is to be noted that Fig. 2 shows in block form only the equipment directly concerned with the present invention. A complete block diagram of the system is shown and described in the above-identified application.

As shown in Fig. 1, calls between subscribers in different local offices may be routed through one or more long distance switching centers. For example, a call from a subscriber in local office 1 to a subscriber in local office 9 is routed through long distance switching centers 2, 5, and 8. The call is initiated by the transmission of a voice frequency seize signal over a trunk line interconnecting office 1 and long distance switching center 2, which trunk line is four-wire and may be either physical wire or a radio link. In long distance switching center 2, a line terminating unit, such as unit 22, terminating that trunk line is marked as a unit terminating the trunk line from a local office and when seized, serves to automatically control an incoming register, such as register 23, in that office to route the call to an operator position. In accordance with oral instructions received over the connection from the originating subscriber at local office 1, the answering operator in office 2 then keys the routing digits required to reach local office 9 on the keyset associated with the register sender at the answering operator position. The keyed number comprises routing digits corresponding to long distance switching centers 5 and 8, an arbitrary digit identifying local, and a digit corresponding to local office 9. The common equipment in long distance switching center 2 then functions to seize an idle terminating unit, such as 21, which terminates a trunk line extending to long distance switching center 5, and a seize signal is transmitted over that trunk line to seize the unit terminating that trunk line in long distance switching center 5. In long distance switching center 5, an incoming register, such as 23, then controls the common equipment in that office, in accordance with the digit received from the register sender in office 2, to select an idle terminating unit which terminates a trunk line extending between long distance switching centers 5 and 8. The operation in long distance switching center 8 is identical to that just described in long distance switching center 5 with the exception that the arbitrary local identifying digit followed by the digit corresponding to local office 9 control the incoming register 23 in that office to control the selection of an idle terminating unit extending to local office 9 in the groups of local terminating units. Thus, it can be seen that the extension of a call is controlled from the operator position at the first long distance switching center encountered, the intermediate switching centers are each controlled by a single digit to select an idle trunk line to the next long distance switching center, and the final long distance switching center is controlled by two digits to select the desired local office.

Fig. 2, which shows in block diagram form a portion of the equipment located at any one of the long distance switching centers, will now be described in more detail. Although just two line terminating units, namely, units 21 and 22, have been shown, it is to be understood that there is provided a group of line terminating units 21 for each long distance switching center accessible to the illustrated switching center, and a group of line terminating units 22 for each local office accessible to the illustrated long distance switching center. For example, long distance switching center 5 comprises a group of line terminating units, such as unit 21, which units terminate trunk lines or radio links between long distance switching centers 2 and 5 and a group of line terminating units, such as 21, which units terminate trunk lines or radio links between long distance switching centers 8 and 5. Long distance switching center 5 also comprises a group of line terminating units, such as unit 22, which units terminate trunk lines or radio links between local office 3 and switching center 5 and a group of line terminating units, such as unit 22, which units terminate trunk lines or radio links between local office 4 and long distance switching center 5. Similarly, only one incoming register, namely, incoming register 23, has been shown but it is to be understood that the number of incoming registers actually employed will be determined by the existing traffic conditions.

The line terminating units, such as 21 and 22, and the incoming registers, such as 23, are interconnected by one or more transmission highway networks. Two transmission highway networks are shown and are labeled highway 1 and highway 2. Each of the transmission highway networks comprises four wires carrying ten time division multiplex channels. Multiplex pulse generator 24 is provided in the system for the purpose of continuously providing recurring pulses which individually identify the ten channels in each highway network. The recurring time position pulses individually applied to ten conductors by multiplex pulse generator 24 are routed over cable TPP to all of the line terminating units, to each of the highway monitor circuits, and to each of the incoming registers. As fully described in the above identified application, the above-described pulses are used in each of these circuits to periodically activate switches within each of the circuits for the purpose of connecting that circuit to a selected one of the highway networks in a selected time division channel. The line terminating units and the incoming registers are also interconnected by a control network comprising bus bars HWBB and TPBB. Since the illustrated system includes two ten time position highway networks, the highway marking bus bars HWBB comprise two conductors and the time position marking bus bars comprise ten conductors. The regular channel allotter 25 is normally controlled by channel allotter control circuit 31 to apply a D.-C. potential to one of the highway marking conductors and to one of the channel marking conductors at any given time for the purpose of individually assigning an idle channel to each calling line.

To illustrate the operation of the system, assume that channel allotter 25 is applying a D.-C. potential to the first highway and time position marking conductors of bus bars HWBB and TPBB to thus identify channel 1 on transmission highway network 1 as the next idle channel to be assigned for use. Also assume that incoming register 23 has been assigned for use by incoming register allotter 26. Next assume that a voice frequency seize signal appears on the receive conductors of the trunk line terminated by line terminating unit 21 and that terminating unit 21 is thus seized. Unit 21 is responsive to seizure to apply potential to unit connect demand conductor UCD which is common to all of the units and which extends to calling unit finder circuit 27.

Calling unit finder circuit 27 functions to transmit marking or enabling signals to each of the units in turn only when potential is applied to the unit connect demand conductor UCD by one or more of the calling units, when a register has been assigned for use as denoted by the application of potential to register found conductor RF by the incoming register allotter 26, and when an idle channel is being marked on the control network as denoted by the application of potential to the time position found conductor TPF by regular channel allotter 25 or standby channel allotter 28.

Since it was assumed that channel allotter 25 is applying marking signals corresponding to channel 1 on highway network 1 to the control network, that incoming register 23 is assigned for use, and that unit 21 is applying potential to conductor UCD, finder circuit 27 now functions to transmit a marking signal to each of the units in turn. When a marking signal is transmitted to unit 21, the storage circuit in that unit is controlled to read in the highway and channel marking signals applied by channel allotter 25 to the highway and time position marking bus bars HWBB and TPBB, respectively. Also, responsive to the receipt of a marking signal from calling unit finder 27, unit 21 functions to discontinue the application of potential to conductor UCD and functions to apply potential to common register start conductor RST. Conductor RST is gated with an individual register seize conductor from the incoming register allotter in each of the incoming registers so that only the storage circuit in the assigned register is controlled to read in the highway and channel marking signals appearing on the control network when potential is applied to conductor RST by one of the units.

When the storage circuit in register 23 has read in the highway and time position information, a signal is applied to time position read in conductor TPRI, which extends from the incoming registers to channel allotters 25 and 28. The signal applied to conductor TPRI is effective in channel allotters 25 and 28 to mark the assigned channel 1 on highway 1 busy within the allotters so that that time position cannot be assigned to another call, the distributors in allotters 25 and 28 advance to their next succeeding setting, and allotter 25 is controlled to apply marking signals corresponding to the next idle channel to bus bars HWBB and TPBB.

Each of the line terminating units and each of the incoming registers comprises a group of switches for connecting that unit or register to each of the transmission highway networks. In accordance with the channel and highway identifying information read into the storage circuit in any unit or register, the particular pulse on one of the conductors in cable TPP corresponding to the assigned channel is gated to the group of switches corresponding to the assigned highway network and is there utilized to activate the switches. Thus, in the assumed call, the switches associated with highway 1 in both line terminating unit 21 and in incoming register 23 are turned on by the time position 1 pulse in each frame of the recurring time position pulses and unit 21 and register 23 are thereby connected to highway 1 during time position 1. The seize signal appearing on the receive conductors of the trunk line terminated by unit 21 is now detected by a multifrequency receiver in register 23 and, responsive thereto, register 23 serves to transmit a seize acknowledge signal to highway 1 and thus to unit 21 and the send conductors of the trunk line terminated by unit 21. Since unit 21 terminates a trunk line from another long distance switching center, the call being described is set up under control of a register sender in a preceding long distance switching center. The originating register sender is controlled by the received seize acknowledge signal to discontinue the transmission of a seize signal and to then transmit compounded voice frequency signals corresponding to the digit designation of the next long distance switching center to be utilized in establishing the connection. The multi-frequency receiver in register 23 detects the transmitted voice frequency signal corresponding to a particular digit and a digit register in register 23 is set in accordance therewith.

When register 23 is in readiness to read out registered information, register finder 29 is controlled to search for and seize incoming register 23. Register 23 is now controlled to read out the channel identification information stored in its storage circuit to the highway and time position bus bars HWBB and TPBB, respectively. Simultaneously therewith, register 23 serves to apply potential to one of the digit marking conductors, identified as DM, in accordance with the designation of the called unit registered in the digit register of incoming register 23. Also simultaneously therewith, register finder 29 applies potential to found register conductor FR, which extends to channel allotters 25 and 28, to route selector 30 and to calling unit finder 27. The potential applied to conductor FR controls channel allotter 25 to terminate the application of marking potentials to bus bars HWBB and TPBB. The potential applied to conductor FR also controls the calling unit finder 27 to terminate the transmission of marking signals to the line terminating units if unit finder 27 is in the process of finding a calling unit. Thus, when a register is reading out channel identifying information to the bus bars, the channel allotter in use is disconnected from said bus bars and the calling unit finder is disabled so that the time position marked by the register cannot be seized by a calling unit.

Route selector 30 is controlled by the marking applied to one of the conductors DM by the incoming register to select the desired called group of units and to select an idle unit in that group. If, as was assumed, the call is to be routed to another long distance switching center, a line terminating unit identical to unit 21 is seized by the route selector by the application of potential to a unit marking conductor corresponding to that unit. If there is no idle unit in the selected group, route selector 30 applies potential to all trunks busy conductor ATB which controls register 23 to return a busy signal to the originating office and also controls the channel allotters to resume their operation. When an idle unit in the called group is seized, route selector 30 functions to apply potential to the unit found conductor UF, which extends to the channel allotter control circuit and the incoming registers. When potential is applied to conductor UF, register 23 is released, and channel allotter control circuit 31 is controlled by the next occurring clock pulse to control channel allotter 25 to reapply the marking potentials corresponding to the next idle channel to bus bars HWBB and TPBB. The storage circuits in the calling and called units now control the connection of their respective units to highway 1 during time position 1 for the transmittal of speech and supervisory signals between the units for the duration of the call. At the termination of the call, a voice frequency release signal is transmitted over either the calling trunk line or the called trunk line and is detected by highway 1 monitor circuit 32. The received release signal is regenerated in highway 1 monitor circuit 32 and applied in time position 1 to highway 1. The regenerated release signal is demodulated in the called line terminating unit and applied to the send conductors of the trunk line associated with the called unit. When a release acknowledge signal is returned over the called trunk line, it is detected in highway 1 monitor circuit 32, the regeneration of the release signal is terminated, and circuit 32 serves to apply potential to the time position Busy 1 conductor, which extends in highway monitor 1 cable HM1 to channel allotters 25 and 28. In channel allotters 25 and 28, time position 1 on highway 1 is marked as idle responsive to the receipt of potential on the corresponding conductor in cable HM1.

Only the channel allotter and the channel allotter control circuit are shown in detail and described in the detailed description which follows. A detailed description of the remaining circuits shown in the block diagram may be found in the above-identified copending application.

DETAILED DESCRIPTION

*Channel allotter*

Each of the identical channel allotters, one of which is shown in detail in Figs. 3–5, comprises a highway ring counter distributor and a channel ring counter distributor. As illustrated, the highway distributor comprises two stages, namely, stages HDS1 and HDS2, and the channel distributor comprises ten stages, namely, stages CDS1—CDS10. More highway networks and more channels per highway network can be served by the channel allotter by the addition of stages to the highway and channel distributors, respectively. The channel allotter also comprises an individual gate for each time position on each highway. Gates G1–1 through G1–10 correspond to the ten time position channels on the first highway, and gates G2–1 through G2–10 correspond to the ten time position channels on highway 2. Similarly, an individual flip-flip circuit is provided for each time position on each highway for the purpose of recording the idle or busy condition of that time position. Flip-flips Busy 1—1 through Busy 1—10 individually correspond to the time position channels on highway 1 and flip-flips Busy 2—1 through Busy 2—10 individually correspond to the ten time position channels on highway 2.

When the allotters are first placed in operation, a reset key in the channel allotter control circuit is momentarily operated to apply ground potential to conductor RS and render normally conductive transistor 301 non-conductive. When transistor 301 becomes non-conductive, minus twelve volt potential is applied to the emitter electrode of transistor 302 in the first channel distributor stage CDS1 and to the emitter electrode of a transistor corresponding to 302 in the first highway distributor stage HDS1. The minus twelve volt potential is also applied to the emitter electrode of a transistor corresponding to 303 in each of the channel distributor stages CDS2—CDS10 and to the emitter electrode of a transistor corresponding to 303 in the second highway distributor stage HDS2. Thus, responsive to the momentary operation of the reset key in the channel allotter control circuit, the first channel stage CDS1 and the first highway distributor stage HDS1 are set in the condition in which transistor 303 is conductive and the remaining channel and highway distributor stages are set in the condition in which transistor 302 is conductive.

Since the transistors 302 in stages HDS1 and CDS1 are non-conductive, the output signals appearing at the emitter electrodes of emitter follower transistors 304 and 305 have a negative potential value. The negative potential signal appearing at the emitter of transistor 304 is applied to the base of the highway 1 gating transistor 401 and since negative potential is applied to inhibit conductor INH in the channel allotter control circuit at this time, as will be described later, transistor 401 is made conductive to apply ground potential to conductor HW1 of the highway bus bar HWBB provided that the channel allotter control circuit has assigned the illustrated allotter for use as signified by the application of ground potential to gating control conductor GC. The negative potential signal at the emitter of transistor 304 is also applied to the anode terminal of a diode corresponding to 402 in each of the gate circuits gate G1–1 through gate G1–10, inclusive. The negative potential signal at the emitter of transistor 304 is also applied to the anode terminal of diode 501. The negative potential signal at the emitter of transistor 305 is coupled through resistor 403 to the cathode terminals of diodes 402 and 404 in gate G1–1 and through a corresponding resistor to the cathode terminals of corresponding diodes in gate G2–1. If it be assumed that time position 1 channel on highway 1 is not in use on another call and that Busy 1—1 flip-flip transistors 502 and 503 are therefore non-conductive, the anode terminal of diode 404 in gate G1–1 is also returned to a negative potential. Since the anode terminals of diodes 402 and 404 are both returned to a negative potential, the negative potential at the emitter of transistor 305 and coupled through resistor 403 is further coupled through resistor 405 to the base of transistor 406 in gate G1–1 to render transistor 406 conductive.

When transistor 406 is conductive, ground potential at its collector is coupled through diode 407 to render normally conductive transistor 408 non-conductive. The negative potential signal at the emitter of transistor 305 is also coupled to the base of time position 1 gate transistor 409 and since the anode terminal of diode 410 is also returned to a negative potential at the collector of non-conducting transistor 408, transistor 409 becomes conductive to apply ground potential to the time position 1 bus bar conductor TPM1. Thus, time position 1 on highway network 1 is marked on the highway and time position marking bus bars HWBB and TPBB, respectively, as the time position to be assigned to the next call initiated in the long distance switching center.

The negative potential appearing at the collector of non-conducting transistor 408 is also coupled through diode 411 to the base electrodes of transistors 412 and 306 to render those transistors conductive. The resulting ground potential at the collector of conducting transistor 412 is applied to conductor TPF and serves as an indication to the calling unit finder circuit that a time position channel is being marked on the bus bars by the channel allotter. The ground potential appearing at the collector of conducting transistor 306 serves to prevent the pulse drive transistor 307 from becoming conductive when the next occurring 20 kc. clock pulse appears on conductor 20 kc. trigger. It will be noted that the negative potential at the collector of non-conducting transistor 408 is also applied to the anode terminal of diode 504 but the marking 1 transistor 505 is prevented from becoming conductive at this time since its emitter is returned to a negative potential at the emitter of emitter follower transistor 506. The emitter of transistor 506 stands at a negative potential at this time since the time position read in conductor TPRI, which extends to all of the incoming registers, stands at minus twelve volt potential at all times except when a time position is being read in by one of the registers.

The channel allotter remains in the just described condition in which ground potential is applied to conductors HW1 and TPM1 of the highway bus bars HWBB and the time position bus bars TPBB, respectively, until such time as the time position 1 channel on highway 1 is seized by a calling unit and the assigned register. The remaining highway and time position marking conductors stand at minus twelve volt potential at this time. It can be seen that highway 2 gating transistor 413 is biased for non-conduction and its collector stands at minus twelve volt potential since the transistor corresponding to 302 in the second highway distributor stage HDS2 is conductive and the emitter electrode of emitter follower transistor 308 therefore stands at ground potential. The remaining time position gating transistors, such as time position 10 gating transistor 414, are biased for non-conduction and their collector electrodes stand at minus twelve volt potential since the transistor corresponding to 415 individually associated with each gate is conductive. It can be seen that when transistor 415 is conductive, the ground potential appearing at its collector is coupled through diode 416 to hold transistor 414 non-conductive. In addition to the above, the base electrodes of the gating transistors, such as 414, are also returned to ground potential at the emitter of the emitter follower transistor corresponding to 309.

When the channel and highway identifying information placed on the bus bars by the channel allotter is read in by a calling line terminating unit and the assigned one of the incoming registers, ground potential is momentarily applied to conductor TPRI by the assigned register and the emitter electrode of transistor 506 rises to ground potential. When the emitter electrode of transistor 506 rises to ground potential, each of the marking transistors M1—M10 is enabled for conduction. Marking transistor 505 becomes conductive since the anode terminal of diode 504 is returned to minus twelve volt potential at the collector of non-conducting transistor 408, as previously described. The other marking transistors remain non-conductive since the anode terminal of the diodes corresponding to 507 are returned to ground potential at the collectors of conducting transistors corresponding to 415. Ground potential appearing at the collector of conducting transistor 505 is applied to the anode terminal of the diode corresponding to 508 in both the Busy 1—1 and Busy 2—1 circuits. The Busy 2—1 flip-flip circuit is not triggered since the cathode terminal of diode 509 is returned to ground potential at the emitter of transistor 308. Since the anode terminal of diode 501 is returned to negative potential at the emitter of transistor 304, the positive-going potential swing at the collector of transistor 505 is coupled through diode 508, capacitor 510, and diode 511 to set the Busy 1—1 flip-flip circuit to the condition wherein transistors 502 and 503 are conductive.

When the transistor 503 in the flip-flip circuit Busy 1—1 becomes conductive, ground potential is applied to the anode terminal of diode 404 in gate G1–1 and transistor 406 is thereby made non-conductive, transistor 408 becomes conductive, and transistor 409 is rendered non-conductive to remove ground potential from time position marking conductor TPM1. When transistor 408 becomes conductive and its collector rises to ground potential, transistors 505, 412, and 306 become non-conductive. When transistor 306 becomes non-conductive and its collector drops to minus twelve volt potential, pulse drive transistor 307 is enabled for conduction during the next occurring positive-going pulse on conductor 20 kc. trigger. The positive-going pulse appearing at the collector of transistor 307 is coupled to the anode terminal of a diode corresponding to 310 in each stage of the channel distributor. In stage CDS1, a positive-going pulse is coupled through diode 310 and capacitor 311 to the base of transistor 303 and serves to trigger transistor 303 non-conductive and transistor 302 conductive. The positive-going pulse coupled through diode 310 is also coupled through a capacitor corresponding to 312 to the base of the transistor corresponding to 302 in the second stage of the channel distributor and serves to trigger that stage to the condition wherein transistor 302 is non-conductive and transistor 303 is conductive. Thus, the channel distributor is advanced to its second setting. The positive-going pulse applied to the anode terminal of the diode corresponding to 310 in each of the remaining channel distributor stages has no effect on those stages since the cathode terminal of diode 310 in each of those stages is returned to ground potential at the collector of the conducting transistor 302 in each of those stages.

If the transistors of the Busy 1—2 flip-flip circuit are not conductive, thus signifying that time position 2 on highway 1 is idle, the gate 1—2 transistor corresponding to 406 becomes conductive when stage CDS2 is operated and ground potential is applied to bus bar conductor TPM2. However, if the transistors in Busy 1—2 flip-flip circuit are conductive, thus signifying that time position 2 on highway 1 is busy, the gate 1—2 transistor corresponding to 406 is prevented from becoming conductive by ground potential coupled through the diode corresponding to 404 and the pulse drive transistor 307 is controlled by the next occurring clock pulse on conductor 20 kc. trigger to advance the channel distributor to the setting wherein the third stage CDS3 is activated. As the marked channels are taken into use, the channel distributor is advanced from stage to stage under control of pulse drive transistor 307. Each time that the first stage CDS1 is activated and transistor 303 in that stage becomes conductive, the positive-going potential swing at the collector of that transistor is utilized to advance the highway distributor.

As previously described, the busy flip-flip circuit individually corresponding to a particular one of the channels on one of the highways is triggered to the condition wherein the transistor forming that flip-flip circuit are conductive when that channel is seized. It will be recalled from the general description that a highway monitor circuit is provided for each highway network in the long distance switching center and each monitor circuit functions to continuously scan the time positions on its associated highway network for release and release acknowledge signals. When a release and a release acknowledge signal have been detected by the highway monitor circuit in a particular time position channel, the highway monitor circuit functions to apply a negative-going pulse to the individual time position busy conductor corresponding to that channel. It can be seen than when a negative-going pulse is applied to conductor TPB1 by the highway monitor circuit associated with the first transmission highway network, the pulse is differentiated by capacitor 512 and the positive pulse corresponding to the trailing edge of said pulse is coupled through diode 513 to the base of transistor 503 and serves to render transistors 502 and 503 of the Busy 1—1 flip-flip circuit non-conductive. When transistor 503 becomes non-conductive, a negative potential is again applied to the anode terminal of diode 404 in gate 1—1 to thus mark time position 1 on highway 1 idle so that that time position can be assigned for use again when the highway and channel distributors advance to the setting wherein stages HDS1 and CDS1 are activated.

The remaining features of the channel allotter will be described in conjunction with the following description of the channel allotter control circuit.

*Channel allotter control circuit*

The channel allotter control circuit, which is shown in Figs. 6–8 of the drawings, is provided in the system for the purpose of controlling the operation of the regular and standby channel allotters and for continuously monitoring the operation of said allotters. Under normal operating conditions, the control flip-flip circuit comprising transistors 601 and 602 is in the condition wherein both of said transistors are non-conductive and negative potential is applied to the gating control conductor GC2, which extends to the second or standby channel allotter, and transistor 701 is held conductive to apply ground potential to the gating control conductor GC1, which extends to the first or regular channel allotter. Thus, ground potential is applied to the emitter electrodes of the gating transistors 401, 409, 413, and 414 in the regular allotter of Fig. 4 and the regular allotter is thereby controlled to apply highway and channel identifying marking signals to the line terminating units. Since negative potential is applied to the emitter electrodes of the corresponding gating transistors in the standby allotter, those transistors are disabled and the standby allotter is prevented from transmitting marking signals to the line terminating units.

It will be recalled from the general description that the channel allotter in use is controlled to discontinue the application of channel and highway marking signals to the bus bar conductors whenever an incoming register is being controlled to read out channel and highway marking signals to those bus bars. When the register finder seizes an incoming register for the purpose of controlling that register to read out, ground potential is applied to conductor FR by the register finder. The positive-going potential swing on conductor FR is coupled through capacitor 603 and diode 604 to the base of transistor 605 and serves to operate the flip-flop circuit comprising transistors 605 and 606 to the condition in which transistor 605 is non-conductive and transistor 606 is conductive. When transistor 605 becomes non-conductive, the emitter of emitter follower transistor 607 goes negative and transistor 608 becomes conductive to apply ground potential to inhibit conductor INH. Ground potential on conductor INH is coupled through diodes 417—420 of Fig. 4 to the base electrodes of transistors 401, 413, 409, and 414, respectively, in both the regular and standby allotters. Thus, all of the above-mentioned gating transistors are prevented from becoming conductive regardless of the setting of the highway and channel distributors and the channel allotter in use is effectively disconnected from the highway time position bus bars HWBB and TPBB, respectively.

When a line terminating unit is seized by the route selector and ground potential is applied by the route selector to conductor UF, ground potential is coupled through diode 609 and the output of the "OR" gate for positive signals formed by diodes 609 and 610 goes positive. The positive-going potential swing at the output of the "OR" gate is coupled through capacitor 611 and serves to trigger the flip-flop circuit comprising transistors 612 and 613 to the condition in which transistor 613 is conductive and transistor 612 is non-conductive. When transistor 613 becomes conductive, the left terminal of capacitor 614 is returned to ground potential. The next occurring positive-going clock pulse on conductor 20 kc. trigger is coupled through capacitor 614 and diode 615 to reset the flip-flop circuit comprising transistors 605 and 606 to the condition in which transistor 605 is again conductive. When transistor 605 becomes conductive, the output signal from emitter follower transistor 607 goes to ground potential, transistor 608 becomes non-conductive, and the channel allotter in use is again effectively connected to the highway and channel bus bars. The positive-going potential swing at the emitter of transistor 607 is also coupled through capacitor 616 to reset the flip-flop circuit comprising transistors 612 and 613 to the condition wherein transistor 612 is conductive.

In the event that the route selector does not find an idle line terminating unit in the group of units marked by the register being read out, the route selector functions to apply ground potential to the all trunks busy conductor ATB. The ground potential appearing on conductor ATB is coupled through diode 610 and is utilized to operate the flip-flop circuit comprising transistors 612 and 613 in the exact same manner as just described.

Twenty control gates, identified as C1–1 through C2–10 in Fig. 6, are provided in the system for the purpose of comparing the settings of the corresponding busy indicating flip-flip circuits in the regular and standby allotters. As illustrated, the operation of the first control gate comprising transistors 617 and 618 is controlled by the Busy 1—1 flip-flip circuits in the regular and standby allotters since the base of transistor 618 and the emitter of transistor 617 are returned over conductor 1B1–1 to the collector of transistor 503 in the regular allotter busy flip-flip circuit Busy 1—1, while the base of transistor 617 and the emitter of transistor 618 are returned over conductor 2B1–1 to the corresponding flip-flip circuit in the standby allotter. When the channel allotter busy indicating flip-flip circuits are operated in synchronism, no output is realized from the control gates since the base and emitter electrodes of both transistors comprising each gate are either at ground or negative potential. For example, it can be seen that when the Busy 1—1 flip-flip circuits of both allotters are in their second operated or busy indicating condition, ground potential is applied to the base and emitter electrodes of transistors 617 and 618. Similarly, when the Busy 1—1 flip-flip circuits of both allotters are in their first operated or non-busy indicating condition, negative potential is applied to the base and emitter electrodes of transistors 617 and 618.

To illustrate the operation of the control gates, first assume that the second or standby allotter busy indicating flip-flip circuit Busy 1—1 triggers to its second operated or busy indicating condition but the regular allotter Busy 1—1 circuit fails to trigger for some reason. Under these conditions, negative potential appears on conductor 1B1–1 and is applied to the base of transistor 618 and the emitter of transistor 617 while ground potential appears on conductor 2B1–1 and is applied to the base of transistor 617 and the emitter of transistor 618. Thus, transistor 618 is rendered conductive and the resulting ground potential at its collector is coupled through diode 619 to render normally conductive transistor 702 in the first allotter indicating circuit A1I1–1 non-conductive. When transistor 702 becomes non-conductive, the emitter of emitter follower transistor 703 goes negative and transistor 704 becomes conductive to illuminate the alarm lamp 705 which corresponds to the first time position channel on highway 1. Also, when any one of the transistors corresponding to 618 becomes conductive to illuminate the alarm lamp corresponding to its associated time position channel, ground potential appearing at the collector of the conducting transistor 618 is coupled through a diode corresponding to 620 in that control gate and through capacitor 621 and diode 622 to trigger the control flip-flip circuit to the condition in which both transistors 601 and 602 are conductive. When transistor 602 becomes conductive, ground potential is applied to conductor GC2 to effect transfer to the standby allotter and negative potential is applied to conductor GC1 to disable the regular allotter. If a second or standby allotter busy indicating flip-flip circuit should fail to trigger to its second operated condition, the transistor 617 in the control gate corresponding to that channel is rendered conductive and ground potential is coupled through the diode corresponding to 625 in that control gate to illuminate the alarm lamp in the second allotter indicating circuit corresponding to that channel. To summarize, a lamp indication is given to indicate which allotter is reading short and on which particular channel or channels.

Assume that lamp 705 in the first allotter indicating circuit A1I1–1 is illuminated, thus indicating that either the Busy 1—1 flip-flip circuit in the first allotter failed to operate to its second operated condition responsive to the seizure of channel 1—1 by a calling line, or the Busy 1—1 flip-flip circuit in the second allotter failed to restore to its first operated condition when a call on channel 1—1 was terminated. The maintenance man now connects an oscilloscope to highway 1 in time position 1, or plugs a test set into a monitor jack corresponding to channel 1—1, or in any other well known manner determines whether channel 1 on highway 1 is actually idle or busy.

Assume that as a result of monitoring the channel, the maintenance man determines that channel 1 on highway 1 is actually busy, thus indicating that the first allotter is reading short. Under these conditions, it is necessary to advance the count in the busy indicating circuits of the first allotter by selectively operating the Busy 1—1 flip-flip circuit therein to its second operated condition. For this purpose, the maintenance man operates highway 1 selecting key 801, time position 1 selecting key 802, and the advance key 803. When key 803 is operated, ground potential is applied to the cathode terminal of diode 804 and a negative-going pulse is coupled through capacitor 805 to the base of transistor 806 in delay multivibrator DMV1. Transistors 806 and 807 form a monostable circuit in which transistor 807 is normally conductive and transistor 806 is normally non-conductive. When a negative pulse is coupled to the base of transistor 806, transistor 806 is rendered conductive and transistor 807 is triggered non-conductive through capacitor 825 to hold transistor 806 conductive for the charge time of capacitor 825. After approximately one hundred microseconds, the circuit reverts to its normal condition. The resulting one hundred microsecond negative pulse at the collector of transistor 807 renders transistor 808 conductive and the resulting ground pulse at the collector of transistor 808 is applied to reset conductor RS. The positive-going potential swing on conductor RS is coupled through capacitor 623 and diode 624 to reset the control flip-flip circuit to its normal condition and thus place the first allotter back in use. Ground potential on conductor RS is also coupled through a diode corresponding to 313 in each channel allotter to the base of the reset transistor 301 in that allotter to render said transistor non-conductive. The negative pulse at the collector of transistor 301, of course, serves to reset the channel and highway distributors in both allotters to their first step so that the regular and standby allotter distributors are brought into synchronism.

The operation of key 803 also serves to trigger delay multivibrator DMV2 of Fig. 8. DMV2 is identical to DMV1 except that it functions to produce a negative pulse of approximately three hundred microseconds duration. Thus, a three hundred microsecond ground pulse appears at the collector of transistor 809 and is coupled over conductor PS and through the diode corresponding to 314 to clamp the base of the drive transistor 307 in each alloter to ground potential and thus prevent the transistor 307 from becoming conductive to advance the distributors while the allotters are being reset.

Also responsive to the operation of key 803, delay multivibrators DMV3 and DMV4 are triggered to produce fifty and twenty-five microsecond negative pulses, respectively. The negative fifty microsecond pulse at the output of DMV3 drives the emitter of emitter follower transistor 810 negative and transistors 811 and 812 become conductive and non-conductive, respectively, but without effect when a busy flip-flip circuit corresponding to a channel on highway 1 is being operated to its second operated condition. It is to be noted that the operation of transistor 810 also has no effect on transistor 814 at this time since ground potential is coupled from the contacts of key 801 through diode 813 to the base of transistor 814. Thus, conductor LW1 remains at negative potential when a highway 1 busy flip-flip circuit is being set. It can be seen that the anode terminal of diode 514 in Fig. 5 is returned to the negative potential on conductor LW1 and since stage HDS1 in each allotter distributor is now in an indicating condition, the anode terminal of diode 501 is also returned to negative potential and the Busy 1—1 through Busy 1—10 flip-flip circuits in each allotter are enabled for operation.

At the termination of the twenty-five microsecond negative pulse appearing at the output of DMV4, a positive pulse is coupled through capacitor 815 to render transistors 816 and 817 conductive. The positive-going pulse appearing at the collector of transistor 817 is coupled through contacts of key 802 to conductor RS1 and is further coupled through diode 515 in each allotter to the anode terminals of the diodes 508 in the Busy 1—1 and Busy 2—1 flip-flip circuits in both the first and second allotters. Since it was assumed that the Busy 1—1 flip-flip circuit in the second allotter is already operated to its second operated condition, the positive pulse applied to the anode terminal of diode 508 in that busy indicating circuit has no effect on that circuit. However, in the first allotter, the positive pulse is coupled through diode 508, capacitor 510, and diode 511 to the base of transistor 502 and serves to trigger the Busy 1—1 flip-flip circuit in the first allotter to its second operated condition. Thus, responsive to the operation of keys 801, 802, and 803, the allotter distributors are reset to the same setting and the Busy 1—1 circuit in the first allotter in selectively operated to its second operated condition.

The operation is slightly different from the above when a busy indicating flip-flip circuit corresponding to a channel on the second highway is selectively operated to its second operated condition. To illustrate the operation, assume that highway 2 selecting key 823 is operated at the time when key 803 is operated. Under these conditions, the negative pulse appearing at the emitter of emitter follower transistor 810 renders transistors 811 and 812 conductive and non-conductive, respectively, and a negative pulse is applied through the contacts of key 823 to conductor LW2 and thus to the cathode terminal of diode 516 in Fig. 5. The output of the "OR" gate for negative signals, comprising diodes 509 and 516, thus goes negative and busy flip-flip circuits Busy 2—1 through Busy 2—10 in each allotter are enabled for operation. It is to be noted that when the emitter of transistor 810 goes negative, transistor 814 is rendered conductive and a positive pulse is applied to conductor LW1 and thus to the anode terminal of diode 514 in Fig. 5. Diodes 501 and 514 form an "OR" gate for positive signals rather than an "OR" gate for negative signals. This is necessary since the allotter distributors are reset at this time and negative potential is therefore applied to the anode terminal of diode 501. The ground potential applied to conductor LW1 at this time prevents the false operation of a busy indicating circuit corresponding to a channel on highway 1.

Next assume that as a result of monitoring the channel, the maintenance man determines that channel 1 on highway 1 is idle, thus indicating that the second allotter Busy 1—1 flip-flip circuit is falsely operated to its second operated condition. Under these conditions, it is necessary to set back the count in the busy indicating circuits of the second allotter by selectively restoring the Busy 1—1 flip-flip circuit therein to its first operated condition. For this purpose, the maintenance man operates highway 1 selecting key 801, time position 1 selecting key 802, and the setback key 824. Responsive to the operation of key 824, delay multivibrators DMV1 and DMV2 are triggered to reset the allotter distributors and block the pulse drive transistor in each allotter, respectively, as previously described. Also responsive to the operation of key 824, the emitter electrodes of matrix transistors 818—821 are returned to ground potential and said transistors are enabled for operation. Negative potential on the contacts of key 801 is applied through resistors to the base electrodes of transistors 818 and 819 and negative potential on the contacts of key 802 is applied to the anode terminals of diodes 822 and 823. Under these conditions, only transistor 818 is rendered conductive and ground potential is applied to reset conductor RS1-1 and thus to the anode terminal of the diode corresponding to 517 in each allotter. Since it was assumed that Busy 1—1 flip-flip circuit in the first allotter is in its first operated condition, the positive pulse coupled through diode 517 in the first allotter has no effect on that circuit. However, in the second allotter, the positive pulse is coupled through diode 517, capacitor 512, and diode 513 to the base of transistor 503 and serves to trigger the Busy 1—1 flip-flip circuit in the second allotter to its first operated condition. Thus, responsive to the operation of keys 801, 802, and 824, the allotter distributors are reset to the same setting and the busy 1—1 flip-flip circuit in the second allotter is selectively operated to its first operated condition.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a telephone system, a plurality of lines, a multichannel transmission highway network interconnecting said lines, first and second channel allotters, each of said allotters comprising a plurality of busy indicating circuits individually corresponding to the channels of said network, each of said circuits having first and second operated conditions, means for controlling said first allotter to individually assign idle ones of said channels to calling ones of said lines, means responsive to the assignment of a channel to a calling one of said lines for operating the circuit corresponding to that channel in each allotter to its second operated condition, a plurality of first alarm devices individually corresponding to said channels, a plurality of second alarm devices individually corresponding to said channels, means for energizing the first alarm device corresponding to a particular channel when the first allotter circuit corresponding to that channel is in its second operated condition and the second allotter circuit corresponding to that channel is in its first operated condition, and means for energizing the second alarm device corresponding to a particular channel when the second allotter circuit corresponding to that channel is in its second operated condition and the first allotter circuit corresponding to that channel is in its first operated condition.

2. The system of claim 1 including means responsive to the energization of any one of said second alarm devices for thereafter controlling said second allotter to individually assign idle ones of said channels to calling ones of said lines.

3. The system of claim 1 including resetting means for selectively changing the operated condition of any one of said busy indicating circuits in said first and second allotters.

4. In a telephone system, a plurality of lines, a multichannel transmission highway network interconnecting said lines, first and second channel allotters, each of said allotters comprising a plurality of busy indicating circuits individually corresponding to the channels of said network, each of said circuits having first and second operated conditions, means for controlling said first allotter to individually assign idle ones of said channels to calling ones of said lines, means responsive to the assignment of a channel to a calling one of said lines for operating the circuit corresponding to that channel in each allotter to its second operated condition, means responsive to the termination of a call on a channel for restoring the circuit corresponding to that channel in each allotter to its first operated condition, a plurality of first alarm devices individually corresponding to said channels, a plurality of second alarm devices individually corresponding to said channels, means for energizing the first alarm device corresponding to a particular channel when the first allotter circuit corresponding to that channel is in its second operated condition and the second allotter circuit corresponding to that channel is in its first operated condition, and means for energizing the second alarm device corresponding to a particular channel when the second allotter circuit corresponding to that channel is in its second operated condition and the first allotter circuit corresponding to that channel is in its first operated condition.

5. The system of claim 4 including means responsive to the energization of any one of said second alarm devices for thereafter controlling said second allotter to individually assign idle ones of said channels to calling ones of said lines.

6. The system of claim 4 including resetting means for selectively changing the operated condition of any one of said busy indicating circuits in said first and second allotters.

References Cited in the file of this patent

UNITED STATES PATENTS

| | | |
|---|---|---|
| 2,830,125 | Elliott | Apr. 8, 1958 |
| 2,848,549 | Trousdale et al. | Aug. 19, 1958 |